March 13, 1945.    B. G. OLVING    2,371,257
ELECTRIC IRON
Filed May 20, 1942    2 Sheets-Sheet 1

INVENTOR.
BROR G. OLVING
BY
H. M. Biebel
ATTORNEY

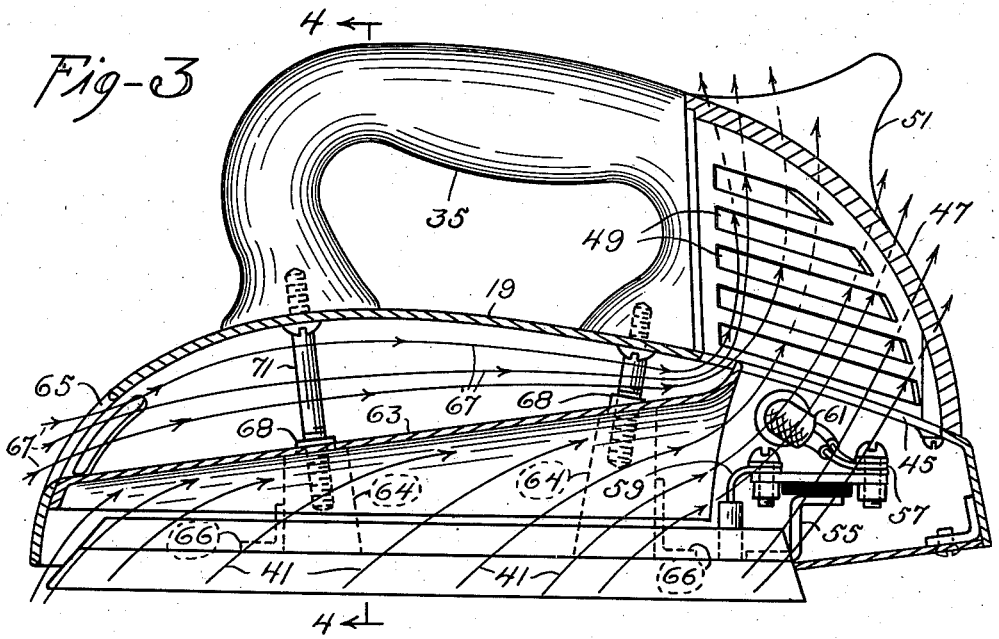
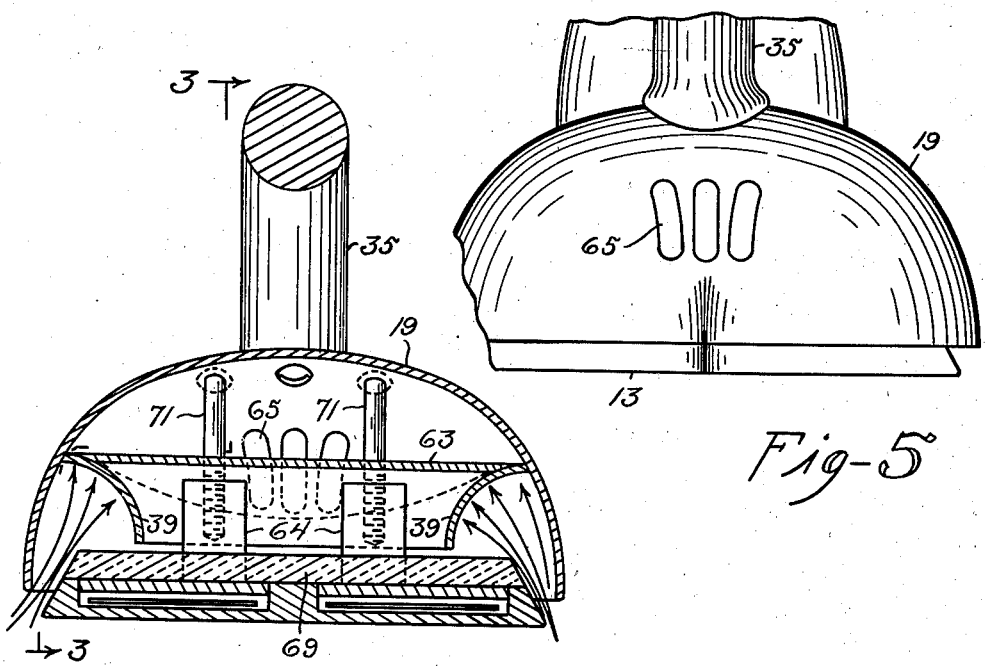

Patented Mar. 13, 1945

2,371,257

UNITED STATES PATENT OFFICE 2,371,257

ELECTRIC IRON

Bror G. Olving, Elgin, Ill., assignor to McGraw Electric Company, Elgin, Ill., a corporation of Delaware Application May 20, 1942, Serial No. 443,775

2 Claims. (Cl. 38—89)

My invention relates to electric pressing irons and has particular reference to means for maintaining the casing of such an iron at a relatively low temperature.

Another object of my invention is to provide relatively simple means in an electric pressing iron to prevent high temperatures occurring particularly at the upper or dome part of the casing of such an electric iron.

Other objects of my invention will either be apparent from a description of several forms of electric irons embodying my invention or will be pointed out during the course of such description and set forth particularly in the appended claims.

Fig. 3 is a view in longitudinal vertical section showing a modified form of electric pressing iron embodying my invention and taken on the line 3—3 of Fig. 4, Fig. 4 is a cross-sectional view on the line 4—4 of Fig. 3, and, Fig. 5 is a fragmentary front elevational view of the iron shown in Figs. 3 and 4, showing particularly the grill openings in the case.

The tendency in the development of electric pressing irons has been, of late, to increase the amount of electrical energy translated into heat in the heating element of the iron, and in many cases, to reduce the weight of the iron. In many cases this has resulted in a relatively high temperature occurring in the hollow casing, usually of sheet metal, during the operation of the iron. The temperature rise of that part of the casing which might be accidentally engaged by the fingers of an operator has sometimes been sufficiently high to cause searing of the skin of the operator's fingers and my invention is intended to prevent such accidental injury.

Figure 1:
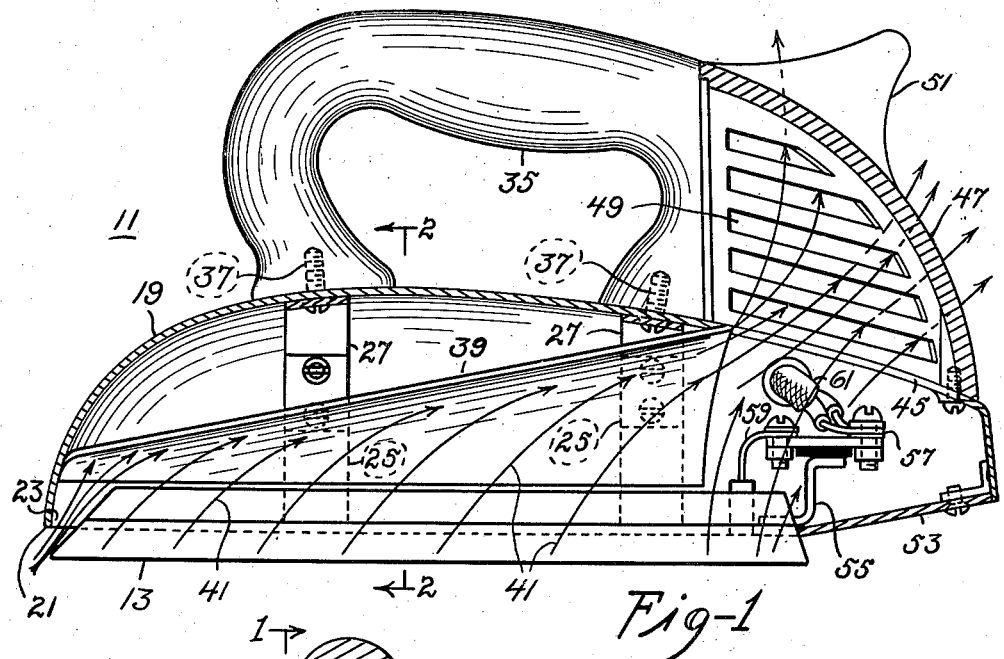
Figure 1 is a view in longitudinal vertical section on the line 1—1 of Fig. 2.
Figure 2:
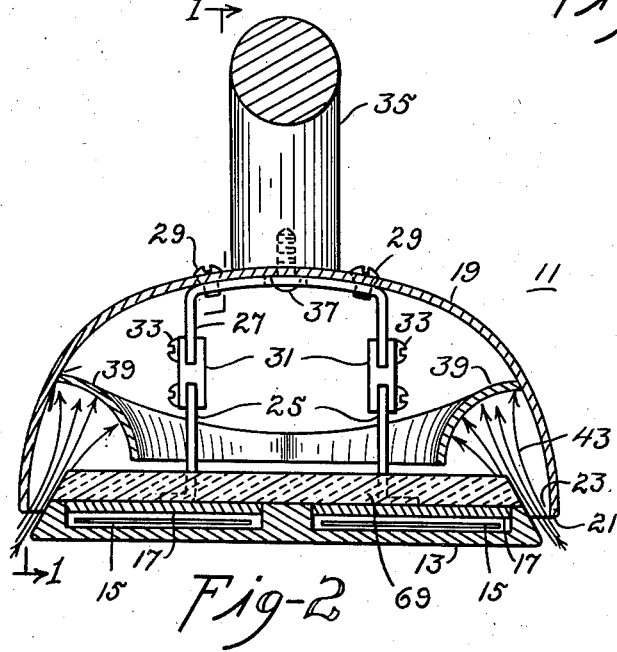
Fig. 2 is a vertical cross-sectional view taken on the line 2—2 of Fig. 1.

Referring first to Figs. 1 and 2 of the drawings, I have there illustrated an electric pressing iron, designated generally by the numeral 11, as including a soleplate 13 which may have insulatedly mounted therein a pair of electric heating elements 15 shown generally only in Fig. 2 of the drawings. It is to be understood that the heating elements include a resistance wire or strand of extended conformation which may be insulatedly supported within a depressed portion of the soleplate and may be held in place by top clamping plates 17. These plates 17 may be held securely in proper operative heat-transmitting positions within the soleplate 13 by any suitable means which it is believed it is not necessary to describe since this detail forms no part of my present invention.

I provide further a hollow casing 19 of a shape to conform to the shape of the soleplate 13.

I provide means for supporting the casing 19 in the desired operative position above the heated body constituted by the soleplate, the heating elements, and the clamping plates. This position is such that the lower edge 21 of the casing 19 is spaced above the ironing surface of the soleplate 13 as well as horizontally away from the angularly-extending outer edge of the soleplate, the space or opening between the soleplate and the lower edge of the casing being shown at 23 in Figs. 1 and 2 of the drawings.

The means for supporting the hollow casing above and out of contact with the heated body may include pairs of brackets 25, each of substantially L-shape, the lower end of which may be suitably fixedly supported on the heated body in any desired manner. I provide an upper bracket 27 of substantially inverted U-shape, as shown more particularly in Fig. 2 of the drawings, the intermediate portion of which may be secured against the under surface of the hollow casing as by short machine screws 29. The depending end portions of the bracket 27 may interfit with blocks 31 of a suitable non-heat-conducting material, which may, for example, be asbestos board, the upper ends of the brackets 25 and the lower ends of the bracket 27 being held in recesses in the blocks 31 by machine screws 23. It is to be noted, however, that the means illustrated and described hereinbefore for supporting the hollow casing are illustrative only and I do not desire to be limited to the particular details shown.

I provide further a handle 35 of any suitable or desired shape and which handle may be made of a moulded composition material, as desired, and the depending end portions of the handle may be secured against the outer surface of the hollow casing as by machine screws 37. It is obvious that during normal use of the iron when ironing goods resting on an ironing board, air in the form of convection currents will tend to flow through the elongated gap or space 23 and while such convection current may not be very large, there will be a tendency for the air flowing past the heated body through the gap 23 to become heated and ultimately, say after several hours continuous use of the pressing iron, the temperature of the dome part of the casing may become relatively high which may result in burning the operator's fingers if they are moved accidentally into contact with the casing.

I therefore provide a pair of air chutes 39 of laterally bent or arcuate form, as shown more particularly in Fig. 2 of the drawings, which air chutes have their outer edges shaped to conform to the shape of the inner surface of the casing and be secured thereto. Reference to Fig. 1 of the drawings will indicate that each air chute extends angularly upwardly from the toe to the heel of the iron. It will be further noted by reference to Fig. 2 of the drawings that the general shape of the lateral section of each air chute is arcuate and the chute extends arcuately downwardly away from the casing.

I have indicated by the plurality of arrows 41 in Fig. 1 of the drawings the general course of the air currents as they occur in an iron of this kind. The air first enters the gap 23 following the general course indicated by the arrows 43 in Fig. 2 of the drawings and after that, because of the rise of the air chute, as shown in Fig. 1 of the drawings, toward the heel of the iron, the air will tend to flow in the general direction indicated by the arrows 41.

I provide a plurality of slots or elongated openings 45 in the rear end part of the casing 19 to permit of the egress of the convection currents of air from the air chutes and generally from the casing. The rear end portion of the casing 19 may be covered by a housing 47 which may be of any suitable or desired material, such as a moulded composition material, and this housing may be provided with openings 49 therein to permit of the outflow of the convection currents of air hereinbefore described. The housing 47 may be provided with an upper integral lug 51 of such shape as to cooperate with a portion of the rear end of the casing to provide a heel rest for the iron. Any suitable or desired means may be provided to secure the housing 47 in its proper operative position. A bottom closure plate 53 may also be provided to extend between the rear end of the casing 19 and the heated body.

I may provide a bracket 55 of substantially Z-shape adapted to have insulatedly mounted thereon terminals 57, one of each of which may be connected to the terminals 59 of the heating element and to a twin conductor cord 61, all in a manner well known in the art.

Referring now to Figs. 3 to 5 of the drawings. I have there shown a modified form of device embodying my invention and those parts shown in Figs. 3, 4 and 5 which are either identical with or substantially the same as similar parts shown in Figs. 1 and 2 are given the same number.

In this form of my invention I provide means constituted particularly by a flat plate 63 having its edges connected with the upper and outer edge portions of the air chutes 39 or with the inner surface of the wall of the casing 19, there being a closed or solid connection between the flat plate 63 and either the air chute 39 or the casing 19. As shown in Fig. 3 of the drawings, plate 63 also extends angularly upwardly from the toe to the heel of the iron.

Means for supporting the hollow casing 19 above and out of contact with the heated body may include heat-insulating blocks 64, each of substantially square section, the lower ends of which are suitably fixedly supported on the heated body by an L-shaped bracket 66 or in any other desired manner. The upper surface of each of the blocks 64 are inclined to the same angularly upward inclination as is the flat plate 63. The plate 63 rests on the upper inclined surfaces of the blocks 64. The upper surfaces of the blocks 64 are individually provided with an upwardly extending circular lug 68, which extends through circular openings in the plate 63, whereby both plate 63 and casing 19 are held in proper operative position relatively to the soleplate 13.

I provide screws 71 extending downwardly through the casing 19 and threaded into the blocks 64. The screws 71 force the plate 63 into contact with the upper surfaces of the blocks and the lugs 68 on blocks 64 prevent any lateral or end movement of plate 63 relatively to the blocks 64. The handle 35, casing 19 and plate 63 are therefore securely attached to the soleplate 13.

The front end portion of the casing 19 is provided with a plurality of openings 65 to permit of inflow of cooling air under the casing 19, which cooling air flows from toe to heel of the iron above the plate 63.

In order to permit of outflow of the air moving from toe to heel of the iron above the plate 63 as indicated by the arrows 67, the plate 63 may extend rearwardly a short distance back of the front ends of the slots or openings 45 in the casing and may be permitted to flow outwardly through the slots 49 in the housing 47.

The convection currents of heated air trapped by the air chutes 39 will follow the general course shown by the arrows 41 and outwardly through the openings 45 and 49 as hereinbefore described.

It will be noted that that form of device embodying my invention and shown in Figs. 1 and 2 will be effective to trap the convection currents of air entering the peripheral gap 23 to prevent such hot air to a substantial degree from engaging the dome part of the casing 19.

In addition to this, the structure shown in Figs. 3, 4 and 5 of the drawings will tend to cause currents of air to enter the openings 65 at the front end of the casing, to cause such currents of air to flow toward the rear end of the iron above the plate 63 thereby still further reducing the temperature rise of such an iron.

As shown in Figs. 1, 2, 3 and 4, I may provide a plate or slab 69 of heat-insulating material above the heated body to prevent radiation of heat from the heated body against the casing. The structure shown in Figs. 3, 4 and 5 will be highly effective, because of the inclusion of the plate 63, to prevent heat being radiated directly from the upper surface of the heated body to the under surface of the casing.

Various modifications may be made in the structures embodying my invention without departing from the spirit and scope of the appended claims and I desire that all modifications shall be considered to be covered thereby.

I claim as my invention:

1. In a pressing iron, comprising a heated sole plate, a domed hollow casing thereabove having its lower edge horizontally spaced from the outer edges of the sole plate and vertically spaced above the plane of the lower face of the sole plate and having air outlet openings in the heel end of the casing and a horizontally-extending handle structure having a hollow rear end portion positioned above the air outlet openings in said casing and having air outlet openings in the wall thereof, means for preventing air which enters the space between said sole plate and the lower edge of the casing from reaching the dome of the casing, said means including two air chutes of laterally curved shape having their concave portions opening downwardly, secured tightly against the side wall portions of the casing and slanting upwardly from the toe to the heel of the iron, the openings in the rear end portion of the handle structure cooperating with said air outlet openings in the heel end of the casing to produce a chimney effect to accelerate the outward flow of the heated air.

2. In a pressing iron, comprising a heated sole plate, a domed hollow casing thereabove having its lower edge horizontally spaced from the outer edges of the sole plate and vertically spaced above the plane of the lower face of the sole plate and having air outlet openings in its heel portion and a horizontally-extending handle structure having a hollow rear end portion positioned above the air outlet openings in said casing and having air outlet openings in the wall thereof, means for maintaining the dome of the casing at a relatively low temperature during use of the iron, said means including an imperforate plate having side and rear edges engaging the inside surface of the casing and extending in an upwardly slanting direction from toe to heel of the iron to divide the space under the domed casing into an upper and a lower compartment, air inlet openings at the toe and air outlet openings at the heel of the casing above said plate, said plate having an upwardly curved rear end portion ending intermediate the front and the rear ends of the openings in the casing, laterally downwardly curved air chutes below said plate, each air chute having its outer edge in engagement with the inside surface of the casing and slanting upwardly from toe to heel of the casing, the air outlet openings in the hollow rear end portion of the handle structure cooperating with the air outlet openings in the heel of the casing to produce a chimney effect to accelerate the outward flow of air entering said casing through the air inlet openings at the toe of the casing and through the space between the lower edge of the casing and the heated sole plate.

BROR G. OLVING.